(12) United States Patent
Yeo et al.

(10) Patent No.: US 12,431,709 B2
(45) Date of Patent: Sep. 30, 2025

(54) SYSTEMS AND METHODS FOR REDUCING HARMONIC CONTENT IN A POWER NETWORK HAVING DISTRIBUTED ENERGY RESOURCES AND DISTRIBUTED INVERTER SYSTEMS

(71) Applicant: Nanyang Technological University, Singapore (SG)

(72) Inventors: Howe Li Yeo, Singapore (SG); Gil Lampong Opina, Jr., Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 18/661,384

(22) Filed: May 10, 2024

(65) Prior Publication Data

US 2024/0380204 A1    Nov. 14, 2024

(51) Int. Cl.
*H02J 3/01*    (2006.01)
*H02J 3/38*    (2006.01)

(52) U.S. Cl.
CPC ............... *H02J 3/01* (2013.01); *H02J 3/381* (2013.01); *H02J 2203/10* (2020.01)

(58) Field of Classification Search
CPC ........... H02J 3/01; H02J 3/381; H02J 2203/10
USPC ........................................................ 307/105
See application file for complete search history.

(56) References Cited

U.S. PATENT DOCUMENTS

2022/0077688 A1*    3/2022    Patarroyo .................. H02J 3/46

OTHER PUBLICATIONS

Armstrong, Matthew, et al., "Low Order Harmonic Cancellation in a Grid Connected Multiple Inverter System via Current Control Parameter Randomization", IEEE Transactions on Power Electronics, vol. 20, Issue No. 4, Jul. 5, 2005 (Jul. 5, 2005), retrieved on Jul. 11, 2024, retrieved from <URL: https://ieeexplore.ieee.org/document/1461472>, pp. 885-892.

Chilipi, Rajesekhara Reddy, et al., "A Multitasking Control Algorithm for Grid-Connected Inverters in Distributed Generation Applications Using Adaptive Noise Cancellation Filters", IEEE Transactions on Energy Conversion, vol. 31, Issue No. 2, Jan. 13, 2016 (Jan. 13, 2016), retrieved on Jul. 11, 2024, retrieved from <URL: https://ieeexplore.ieee.org/document/7381645>, pp. 714-727.

(Continued)

*Primary Examiner* — Michael R. Fin
(74) *Attorney, Agent, or Firm* — Sheppard Mullin Richter & Hampton LLP

(57) ABSTRACT

A controller system reduces destructive harmonic content within a power network system, the power network system comprising one or more distributed energy resources, one or more distributed inverter systems, one or more nonlinear loads, and a bus coupling the one or more distributed energy resources to the one or more nonlinear loads. The controller system comprises one or more sensors; one or more hardware processors; and memory storing computer instructions, the computer instructions when executed by the one or more hardware processors configured to perform receiving, by the one or more sensors, sensor data indicative of destructive harmonic content of a particular order on the bus; and using a particular distributed energy resource and a particular distributed inverter system to inject constructive harmonic content to reduce the destructive harmonic content.

26 Claims, 11 Drawing Sheets

(56) References Cited

OTHER PUBLICATIONS

Han, Yang, et al., "An Enhanced Power Sharing Scheme for Voltage Unbalance and Harmonics Compensation in an Islanded AC Microgrid", IEEE Transactions on Energy Conversion, vol. 31, Issue No. 3, Apr. 11, 2016 (Apr. 11, 2016), retrieved on Jul. 11, 2024, retrieved from <URL: https://ieeexplore.ieee.org/document/7450663>, 14 pages.

Naderipour, A., et al., "An Advanced Current Control Compensation Scheme to Improve the Microgrid Power Quality Without Using Dedicated Compensation Devices", 2016 IEEE International Conference on Power and Energy, Nov. 29, 2016 (Nov. 29, 2016), retrieved on Jul. 11, 2024, retrieved from <URL: https://ieeexplore.ieee.org/document/7951552>, pp. 160-165.

Shao, Xiang, "A Novel Method for Implementing Harmonic Compensation with Multi-Inverters in a Micro-Grid", 2020 IOP Conference Series: Materials Science and Engineering; vol. 853, Issue No. 012006, Jan. 12, 2020 (Jan. 12, 2020), retrieved on Jul. 11, 2024, retrieved from <URL: https://iopscience.iop.org/article/10.1088/1757-899X/853/1/012006/meta>, 10 pages.

\* cited by examiner

SYSTEMS AND METHODS FOR REDUCING HARMONIC CONTENT IN A POWER NETWORK HAVING DISTRIBUTED ENERGY RESOURCES AND DISTRIBUTED INVERTER SYSTEMS

FOREIGN PRIORITY

This application claims the benefit under 35 U.S.C. § 119 to Singapore Provisional Application 10202301312T, filed May 11, 2023, the contents of which are incorporated herein by reference in its entirety.

TECHNICAL FIELD

This disclosure pertains power networks and more particularly to systems and methods for reducing destructive harmonic content in a power network having distributed energy resources and distributed inverter systems.

BACKGROUND

Due to growing concerns over climate change, there has been a drive towards adoption of low carbon-dioxide emitting energy resources such as photovoltaics and wind power. In order to ensure compatibility with the electric grid, an inverter stage is connected between the electric grid and distributed energy resources (DER). As the adoption of renewable energy resources increases, it is expected that in the future loads will be supplied locally by a multitude of such distributed energy resources using inverters.

Utility grids have strict regulations with regard to harmonic content. Current and/or voltage harmonics can cause overheating of transformers, motors and cables, thermal tripping of protective devices, logic faults of digital devices, reduced product lifetime, decreased power quality, and more. Accordingly, several grid codes such as Institute of Electrical and Electronics Engineers (IEEE) 519 describe the maximum allowable harmonic content that may be injected into the grid. Hence, in the case of nonlinear loads, such as arc welding furnaces, data centers, variable-speed drives, electronic devices such as computers, printers, televisions, and servers, as well as light emitting diodes and telecommunication systems, harmonic content is sometimes addressed using harmonic filters. However, harmonic filters waste power, often need to be managed by end users and require proper load positions and/or connections. Further, requiring each load to filter out the destructive harmonic content it creates is overly burdensome, especially with the ever-increasing number of loads.

Accordingly, improved systems and methods that reduce current and/or voltage harmonic content would be helpful.

SUMMARY

Embodiments of the present invention may operate in a power network system that uses distributed energy resources and distributed inverter systems to inject constructive harmonic content (current and/or voltage) to reduce destructive harmonic content (current and/or voltage) caused by nonlinear loads in the power network system. Embodiments of the present invention may identify distributed energy resources with sufficient capacity to inject constructive harmonic content, and apply a testing process to identify one or more of the inverter systems and one or more of the distributed energy resources to inject the constructive harmonic content. Embodiments of the present invention may operate without a harmonic filter.

A power network system may include one or more distributed energy resources, which store or provide energy and which may be closer to one or more nonlinear loads. The power network system may include inverter systems coupled to the distributed energy resources and configured to transform between direct current (DC) energy and alternating current (AC) energy bidirectionally between the distributed energy resources and the grid. The inverter systems may be connected directly or via transmission lines to a point of common coupling (PCC). The PCC may also be connected directly or indirectly to the one or more of the nonlinear loads. Notably, some embodiments of the present invention do not require the inverter systems and/or nonlinear loads to be connected directly to PCC. They can be interspersed in the power network system. This can save on costs for additional wiring and reduces restrictions on the user as to where he can connect inverter systems and nonlinear loads.

The power network system may include a controller system capable of detecting destructive harmonic content on the PCC (or on another bus) and capable of communicating with the distributed inverter systems and/or the distributed energy resources to identify and coordinate injection of constructive harmonic content by the distributed inverter systems and/or the distributed energy resources to reduce the destructive harmonic content. In some embodiments, the controller system may include one or more sensors to detect different orders of harmonic content, e.g., odd multiples of a fundamental frequency. In some embodiments, the injected constructive harmonic content includes at least a portion of the destructive harmonic content 180 degrees out of phase.

In some embodiments, the locations of the distributed inverter systems and distributed energy resources are unknown to the controller. Accordingly, the controller system is unaware which distributed inverter system would be most efficient to inject the constructive harmonic content to reduce the destructive harmonic content. The effectiveness of the injected constructive harmonic content in reducing the destructive harmonic content at the PCC (PCC) is understood to be dependent on the proximity of the inverter system to the nonlinear load causing the destructive harmonic content.

In some embodiments, the controller system first locates distributed energy resources with sufficient power capacity to inject at least a portion of the constructive harmonic content. To identify the most suitable inverter system, the controller system may instruct each distributed inverter system associated with a distributed energy resource having sufficient capacity to inject a test amount of constructive harmonic content, which it uses to identify the most suitable distributed energy resource and distributed inverter system to inject the constructive harmonic content. Because the locations of the distributed inverter systems and distributed energy resources are unknown to the controller, the controller system instructs each inverter system to cycle through different phases for the test constructive harmonic content to determine the particular phase (e.g., an optimal phase) that most efficiently decreases the destructive harmonic content by that distributed inverter system.

In some embodiments, the controller system may cycle through each of the distributed inverter systems to identify the most efficient inverter system. In some embodiments, because each inverter system is supplying the same test constructive harmonic content, the controller system can compare the reduction in the destructive harmonic content to determine the degree of effectiveness of each inverter system, which the controller system can compare to identify the most efficient inverter system.

In some embodiments, the controller system may identify any inverter system that reduces destructive harmonic content above an efficiency threshold. Accordingly, in some embodiments, all inverter systems may not be tested.

In some embodiments, once an efficient distributed energy resource and distributed inverter system are identified, the controller system may instruct the distributed energy resource and distributed inverter system to increase constructive harmonic content by an iterative amount until the destructive harmonic content reduces to within guidelines. Each time the constructive harmonic content is increased by an iterative amount, the available power capacity of the distributed energy resource may be evaluated to confirm available capacity has not been exhausted. If the destructive harmonic content is sufficiently reduced to within guidelines or the available power of the distributed energy resource is exhausted, the controller system will instruct the distributed energy resource and distributed inverter system to stop increasing constructive harmonic content. The controller system may then decide whether to seek a second distributed energy resource and distributed inverter system to inject additional constructive harmonic content.

In some embodiments, in a detection stage, the controller system monitors destructive harmonic content until the controller system detects an exceeded limit, e.g., of a particular order (e.g., third, fifth, seventh, ninth). Then, upon detecting the exceeded limit, the controller system may initiate the testing and compensation processes.

In a testing stage, the inverter systems are polled individually to check if they are operating within their apparent power limits. The controller system instructs an individual inverter system to generate test constructive harmonic content at different phases. The test constructive harmonic content may be used to determine a particular phase and/or a degree of effectiveness of an inverter system in counteracting the destructive harmonic content. The controller system may select one particular test counteracting signal of a particular phase, which may be the inverter system that provides the highest effectiveness in reducing destructive harmonic content or the inverter system that has an effectiveness greater than a threshold.

In a compensation stage, the selected inverter is caused to generate constructive harmonic content to reduce the destructive harmonic content. In some embodiments, constructive harmonic content is increased until either the destructive harmonic content is sufficiently suppressed or the selected inverter's apparent power capacity or other threshold is exceeded. If the apparent power capacity is exceeded but destructive harmonic content still remains at a level above a threshold level of destructive harmonic content, the controller system may proceed to find another inverter system to generate additional constructive harmonic content to further reduce the destructive harmonic content. The system may continue to add further inverter systems until some threshold is met. The system may then repeat for other orders of harmonics.

Some embodiments of the present invention provide a controller system for reducing destructive harmonic content within a power network system, the power network system comprising one or more distributed energy resources, one or more distributed inverter systems, one or more nonlinear loads, and a bus coupling the one or more distributed energy resources to the one or more nonlinear loads, the controller system comprising one or more sensors; one or more hardware processors; and memory storing computer instructions, the computer instructions when executed by the one or more hardware processors configured to perform receiving, by the one or more sensors, sensor data indicative of destructive harmonic content of a particular order on the bus; and using a particular distributed energy resource and a particular distributed inverter system to inject constructive harmonic content to reduce the destructive harmonic content.

The destructive harmonic content may comprise harmonic current. The computer instructions when executed may further cause the step of confirming that the particular distributed energy resource has sufficient available output power to inject at least a portion of the constructive harmonic content. The computer instructions when executed may further cause the step of selecting the particular inverter system by causing one of the one or more distributed inverter systems to generate first test constructive harmonic content of the particular order at different phases; monitoring an amount of reduction in the destructive harmonic content to identify its efficiency; determining that the one of the one or more distributed inverter systems has an efficiency greater than a threshold; and using the one of the one or more distributed inverter systems as the particular distributed inverter system. The computer instructions when executed may further cause the step of selecting the particular inverter system by causing each of the one or more distributed inverter systems to generate first test constructive harmonic content of the particular order at different phases; monitoring an amount of reduction in the destructive harmonic content to identify an inverter system with greatest efficiency; and using the inverter system with the greatest efficiency as the particular distributed inverter system. The computer instructions when executed may further cause the steps of selecting the particular inverter system to supply the constructive harmonic content; and iteratively increasing an amount of constructive harmonic content until either the destructive harmonic content has gone below a threshold harmonic content limit or output power of the particular distributed energy resource has gone below a threshold power limit. The particular distributed energy resource may be coupled indirectly to the bus. At least one of the one or more nonlinear loads may be coupled indirectly to the bus. The computer instructions when executed may further cause the steps of receiving, by the one or more sensors, second sensor data indicative of second destructive harmonic content of a second particular order on the bus; and using a second particular distributed energy resource and a second particular distributed inverter system to inject second constructive harmonic content to reduce the second destructive harmonic content. The computer instructions when executed may further cause the steps of using a second particular distributed energy resource and a second particular distributed inverter system to inject additional constructive harmonic content to reduce the destructive harmonic content.

Some embodiments of the present invention may provide a method implemented by a controller system for reducing destructive harmonic content within a power network system, the power network system comprising one or more distributed energy resources, one or more distributed inverter systems, one or more nonlinear loads, and a bus coupling the one or more distributed energy resources to the one or more nonlinear loads, the method comprising receiving, by one or more sensors, sensor data indicative of destructive harmonic content of a particular order on the bus; and using a particular distributed energy resource and a particular distributed inverter system to inject constructive harmonic content to reduce the destructive harmonic content.

The destructive harmonic content may comprise harmonic current. The method may further comprise confirming that the particular distributed energy resource has sufficient available output power to inject at least a portion of the constructive harmonic content. The method may further comprise selecting the particular inverter system by causing one of the one or more distributed inverter systems to generate first test constructive harmonic content of the particular order at different phases; monitoring an amount of reduction in the destructive harmonic content to identify its efficiency; determining that the one of the one or more distributed inverter systems has an efficiency greater than a threshold; and using the one of the one or more distributed inverter systems as the particular distributed inverter system. The method may further comprise selecting the particular inverter system by causing each of the one or more distributed inverter systems to generate first test constructive harmonic content of the particular order at different phases; monitoring an amount of reduction in the destructive harmonic content to identify an inverter system with greatest efficiency; using the inverter system with the greatest efficiency as the particular distributed inverter system. The method may further comprise selecting the particular inverter system to supply the constructive harmonic content; and iteratively increasing an amount of constructive harmonic content until either the destructive harmonic content has gone below a threshold harmonic content limit or output power of the particular distributed energy resource has gone below a threshold power limit. The particular distributed energy resource may be coupled indirectly to the bus. At least one of the one or more nonlinear loads may be coupled indirectly to the bus. The method may further comprise receiving, by the one or more sensors, second sensor data indicative of second destructive harmonic content of a second particular order on the bus; and using a second particular distributed energy resource and a second particular distributed inverter system to inject second constructive harmonic content to reduce the second destructive harmonic content. The method may further comprise using a second particular distributed energy resource and a second particular distributed inverter system to inject additional constructive harmonic content to reduce the destructive harmonic content.

DETAILED DESCRIPTION

Figure 1:
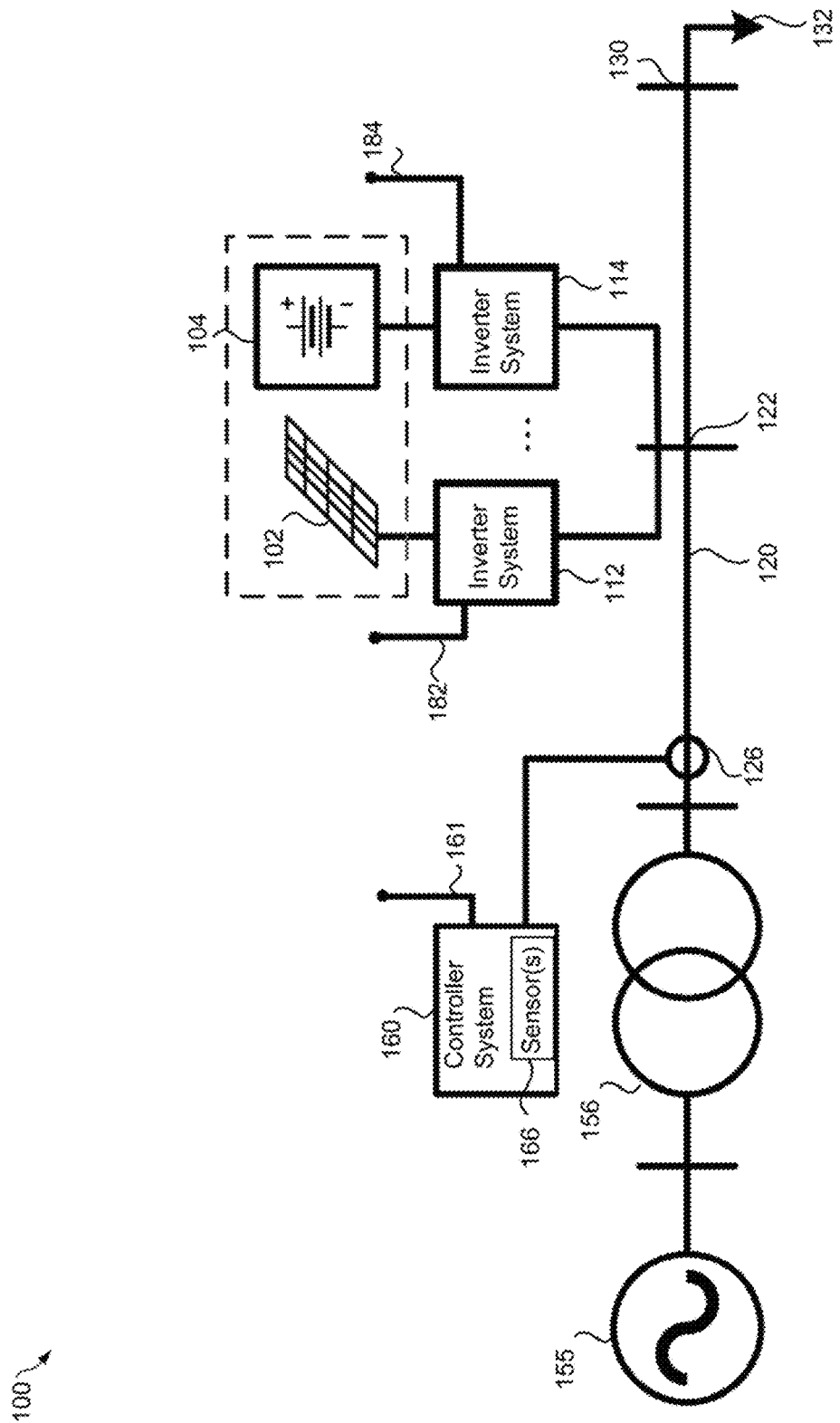
FIG. 1 is a diagram of a power network system with distributed energy resources and distributed inverter systems configured to inject constructive harmonics to adaptively reduce destructive harmonic content caused by nonlinear loads, according to some embodiments of the present invention.

Embodiments of the present invention may operate in a power network system that uses distributed energy resources and distributed inverter systems to inject constructive harmonic content (current and/or voltage) to reduce destructive harmonic content (current and/or voltage) caused by nonlinear loads in the power network system. Embodiments of the present invention may identify distributed energy resources with sufficient capacity to inject constructive harmonic content, and apply a testing process to identify one or more of the inverter systems and one or more of the distributed energy resources to inject the constructive harmonic content. Embodiments of the present invention may operate without a harmonic filter.

A power network system may include one or more distributed energy resources, which store or provide energy and which may be closer to one or more nonlinear loads. The power network system may include inverter systems connected to the distributed energy resources and configured to transform between direct current (DC) energy and alternating current (AC) energy bidirectionally between the distributed energy resources and the grid. The inverter systems may be connected directly or via transmission lines to a point of common coupling (PCC). The PCC may also be connected directly or indirectly to the one or more of the nonlinear loads.

The power network system may include a controller system capable of detecting destructive harmonic content on the PCC (or on another bus) and capable of communicating with the distributed inverter systems and/or the distributed energy resources to identify and coordinate injection of constructive harmonic content by the distributed inverter systems and/or the distributed energy resources to reduce the destructive harmonic content. In some embodiments, the controller system may include one or more sensors to detect different orders of harmonic content, e.g., odd multiples of a fundamental frequency. In some embodiments, the injected constructive harmonic content includes at least a portion of the destructive harmonic content 180 degrees out of phase.

In some embodiments, the locations of the distributed inverter systems and distributed energy resources are unknown to the controller. Accordingly, the controller system is unaware which distributed inverter system would be most efficient to inject the constructive harmonic content to reduce the destructive harmonic content. The effectiveness of the injected constructive harmonic content in reducing the destructive harmonic content at the PCC (PCC) is understood to be dependent on the proximity of the inverter system to the nonlinear load causing the destructive harmonic content.

In some embodiments, the controller system first locates distributed energy resources with sufficient power capacity to inject at least a portion of the constructive harmonic content. To identify the most suitable inverter system, the controller system may instruct each distributed inverter system associated with a distributed energy resource having sufficient capacity to inject a test amount of constructive harmonic content, which it uses to identify the most suitable distributed energy resource and distributed inverter system to inject the constructive harmonic content. Because the locations of the distributed inverter systems and distributed energy resources are unknown to the controller, the controller system instructs each inverter system to cycle through different phases for the test constructive harmonic content to determine the particular phase (e.g., an optimal phase) that most efficiently decreases the destructive harmonic content by that distributed inverter system.

In some embodiments, the controller system may cycle through each of the distributed inverter systems to identify the most efficient inverter system. In some embodiments, because each inverter system is supplying the same test constructive harmonic content, the controller system can compare the reduction in the destructive harmonic content to determine the degree of effectiveness of each inverter system, which the controller system can compare to identify the most efficient inverter system.

In some embodiments, the controller system may identify any inverter system that reduces destructive harmonic content above an efficiency threshold. Accordingly, in some embodiments, all inverter systems may not be tested.

In some embodiments, once an efficient distributed energy resource and distributed inverter system are identified, the controller system may instruct the distributed energy resource and distributed inverter system to increase constructive harmonic content by an iterative amount until the destructive harmonic content reduces to within guidelines. Each time the constructive harmonic content is increased by an iterative amount, the available power capacity of the distributed energy resource may be evaluated to confirm available capacity has not been exhausted. If the destructive harmonic content is sufficiently reduced to within guidelines or the available power of the distributed energy resource is exhausted, the controller system will instruct the distributed energy resource and distributed inverter system to stop increasing constructive harmonic content. The controller system may then decide whether to seek a second distributed energy resource and distributed inverter system to inject additional constructive harmonic content.

Notably, there will be circumstances when a first distributed energy resource and a first distributed inverter system are injecting first constructive harmonic content to reduce destructive harmonic content caused by a nonlinear load. If the nonlinear load disconnects, the nonlinear load may no longer be causing destructive harmonic content. Alternatively, the nonlinear load may reduce its destructive harmonic content. Were the first distributed energy resource and the first distributed inverter system to continue to inject the first constructive harmonic content, the first constructive harmonic content would itself become destructive. Therefore, when testing the system, some embodiments of the controller system would also test a reduction of constructive harmonic content by the same fixed amount to determine the efficiency rating of the test reduction (even if the available power of the distributed energy resource is exhausted). The test reduction efficiency will be compared to the efficiencies of added test constructive harmonic content efficiencies discussed herein. Because reduction of the constructive harmonic content by the first distributed energy resource and the first distributed inverter system process would likely be found most efficient, the controller system would instruct the first distributed energy resource and the first distributed inverter system to decrease, or possibly eliminate, the first constructive harmonic content using an iterative reduction process similar to the iterative additive process discussed herein. That way, some embodiments prevent a second inverter system from being selected to add second constructive harmonic content to offset first constructive harmonic content now being destructive.

In some embodiments, in a detection stage, the controller system monitors destructive harmonic content until the controller system detects a limit being exceeded, e.g., of a particular order (e.g., third, fifth, seventh, ninth). Then, upon detecting the exceeded limit, the controller system may initiate the testing and compensation processes.

In a testing stage, the inverter systems are polled individually to check if they are operating within their apparent power limits. The controller system instructs each inverter system to generate test constructive harmonic content at a fixed amount at different phases. The test constructive harmonic content may be used to determine a particular phase and/or a degree of effectiveness of an inverter system in counteracting the destructive harmonic content. Further, in the testing stage, inverter systems contributing constructive harmonic content will test a reduction of the constructive harmonic content at the fixed amount. In some embodiments, the controller system selects the inverter system that provides the highest effectiveness in reducing destructive harmonic content, which may be the inverter system reducing constructive harmonic content. In some embodiments, the controller system will prioritize reduction of constructive harmonic content. In some embodiments, the inverter system that has an effectiveness greater than a threshold, however, still prioritizing reduction of constructive harmonic content over addition.

In a compensation stage, the selected inverter is caused to perform a counteraction, e.g., generate or reduce constructive harmonic content to reduce the destructive harmonic content. In some embodiments, constructive harmonic content is increased or decreased until either the destructive harmonic content is sufficiently suppressed, all constructive harmonic content being contributed has been eliminated or the selected inverter's apparent power capacity or other threshold is exceeded. If the apparent power capacity is exceeded or all constructive harmonic content being contributed has been eliminated but destructive harmonic content still remains at a level above a threshold level of destructive harmonic content, the controller system may proceed to find another inverter system to generate additional constructive harmonic content to further reduce the destructive harmonic content. The system may continue to add further inverter systems until some threshold is met. The system may then repeat for other orders of harmonics.

Although many of the embodiments below may be described with regard to the generation of constructive harmonic content to counter destructive harmonic content detected, embodiments herein may include the process of also reducing constructive harmonic content.

FIG. 1 depicts a diagram of a power network system 100, in accordance with some embodiments of the present invention. The power network system 100 comprises a controller system 160 coupled to a point of common coupling PCC 120, a first inverter system 112 coupled to a first distributed energy resource 102, and a second inverter system 114 coupled to a second distributed energy resource 104. The power network system 100 includes the electric grid 155 (which includes an alternating current (AC) energy supply) and one or more transformers 156 coupled directly and/or indirectly to the PCC 120. The power network 100 further includes one or more nonlinear loads 132 coupled directly and/or indirectly to the PCC 120. As is known, nonlinear loads cause destructive harmonic content. In accordance with some embodiments of the present invention, the controller system 160 is configured to coordinate with the first inverter system 112 coupled to the first distributed energy resource 102 and/or with the second inverter system 114 coupled to the second distributed energy resource 104 to cause constructive harmonic content to be injected to reduce the destructive harmonic content. Because the controller system 160 is unaware of the location of the one or more nonlinear loads 132, the controller system 160 may perform a testing process to identify the first inverter system 112 and/or the second inverter system 114 to inject the constructive harmonic content.

The power network system 100 may also include a first energy resource 102 connected to the first inverter system 112 and a second energy resource 104 connected to the second inverter system 114. The first energy resource 102 and/or the second energy resource 104 may include any suitable energy resources, such as, for example, one or more batteries, supercapacitors, chargers, generators, motors, substations, renewable energy resources such as photovoltaics, or wind turbines, and/or other energy resources. The first inverter system 112 and the second inverter system 114 may be coupled directly or indirectly to the PCC 120. As shown, the first inverter system 112 and the second inverter system 114 may be coupled to the PCC 120 at point 122. Although two energy resources 102 and 104 and two inverter systems 112 and 114 are shown, the power network system 100 may include any number of energy resources and inverter systems at any locations.

The controller system 160 may also include one or more sensors 166 configured to detect destructive harmonic content on the PCC 120. In some embodiments, the one or more sensors 166 may measure current and/or voltage harmonics on the PCC 120 at a point 126. Although only one sensor is shown, the power network system 100 may include any number and any position of harmonic content sensors.

Upon detecting destructive harmonic content of a particular order (or possibly destructive harmonic content of a particular order that exceeds a threshold) on the PCC 120, the controller system 160 may initiate a testing process to identify the distributed energy resource 102 and the first inverter system 112 or the distributed energy resource 104 and the second inverter system 114 to inject constructive harmonic content to reduce the destructive harmonic content of the particular order. The controller system 160 may first determine whether each of the distributed energy resources 102 and 104 have sufficient energy capacity to provide constructive harmonic content. If so, the controller system 160 may then cycle through the distributed energy resource 102 and the first inverter system 112 and then the distributed energy resource 104 and the second inverter system 114 to inject test constructive harmonic content to determine the efficiency of the destructive harmonic content reduction. The controller system 160 may select the first inverter system 112 or the second inverter system 114 that is most efficient or that exceeds a threshold efficiency. In some embodiments, when only attempting to locate an inverter system that meets a certain threshold efficiency, the controller system 160 may not cycle through all of the inverter systems.

As noted above, because the locations are unknown, the controller system 160 may instruct each distributed inverter system 112 and 114 to cycle through different phases (0, 10, 20 . . . 350) of the test constructive harmonic content to locate the phase with the most constructive effect. The controller system 160 may instruct each distributed inverter system 112 and 114 to cycle through phases between 0 and 360 degrees at any discrete fixed or variable intervals. The intervals may be any value, such as 0.1 degrees, 1 degree, 5 degrees, 10 degrees, or any other value.

Upon selecting one of the first inverter system 112 and second inverter system 114 to generate constructive harmonic content, the controller system 160 may cause the selected inverter system 112 or 114 to iteratively increase its constructive harmonic content at the selected phase until the destructive harmonic content is eliminated, drops below a certain threshold or the available power of the distributed energy resource 102 or 104 is exhausted. As an inverter system 112 or 114 injects more constructive harmonic content, its apparent output power increases and its efficiency decreases due to increase in root mean square (RMS) current. If the available power in the selected inverter system 112 or 114 is exhausted before the destructive harmonic content drops below a threshold, the controller system 160 may then repeat the process to identify a second distributed energy resource and an inverter system to inject additional constructive harmonic content to reduce the detected destructive harmonic content of the particular order. The controller system 160 may then repeat the process for other detected destructive harmonic content of other orders.

As indicated above, in some embodiments, the controller system 160 also tests a contributing distributed energy resource and inverter system to determine whether a decrease in constructive harmonic content results in the destructive harmonic content being reduced. The controller system 160 may perform the test by causing the contributing distributed energy resource and inverter system to reduce the constructive harmonic content it is contributing by the fixed amount. The test reduction efficiency will be compared to the efficiencies of added test constructive harmonic content efficiencies. Because reduction of the constructive harmonic content by the first distributed energy resource and the first distributed inverter system process would likely be found most efficient, the controller system 160 would select the contributing distributed energy resource and the distributed inverter system to decrease the first constructive harmonic content using an iterative reduction process similar to the iterative additive process. That way, some embodiments prevent a second inverter system from being selected to add second constructive harmonic content to offset first constructive harmonic content now being destructive. In some embodiments, if two inverter systems are found to have the same efficiency, but one is a reduction of constructive harmonic content, the inverter system reducing constructive harmonic content will be prioritized.

The controller system 160 may be configured to communicate via wire or wireless connection with the first inverter system 112 and the second inverter system 114. As shown, communications may be transmitted and/or received via an antenna 161 on the controller system 160, an antenna 182 on the first inverter system 112 and an antenna 184 on the second inverter system 114. The controller system 160 may be configured to communicate via a suitable handshaking protocol such as Message Queue Telemetry Transport (MQTT). The network over which the controller system 100 communicates with the inverter systems may include any secured communication network such as an encrypted network. Alternatively, the network may be a wide area network (WAN) or local area network (LAN), public network, private network, IP or non-IP based network or other transmission medium.

Figure 2:
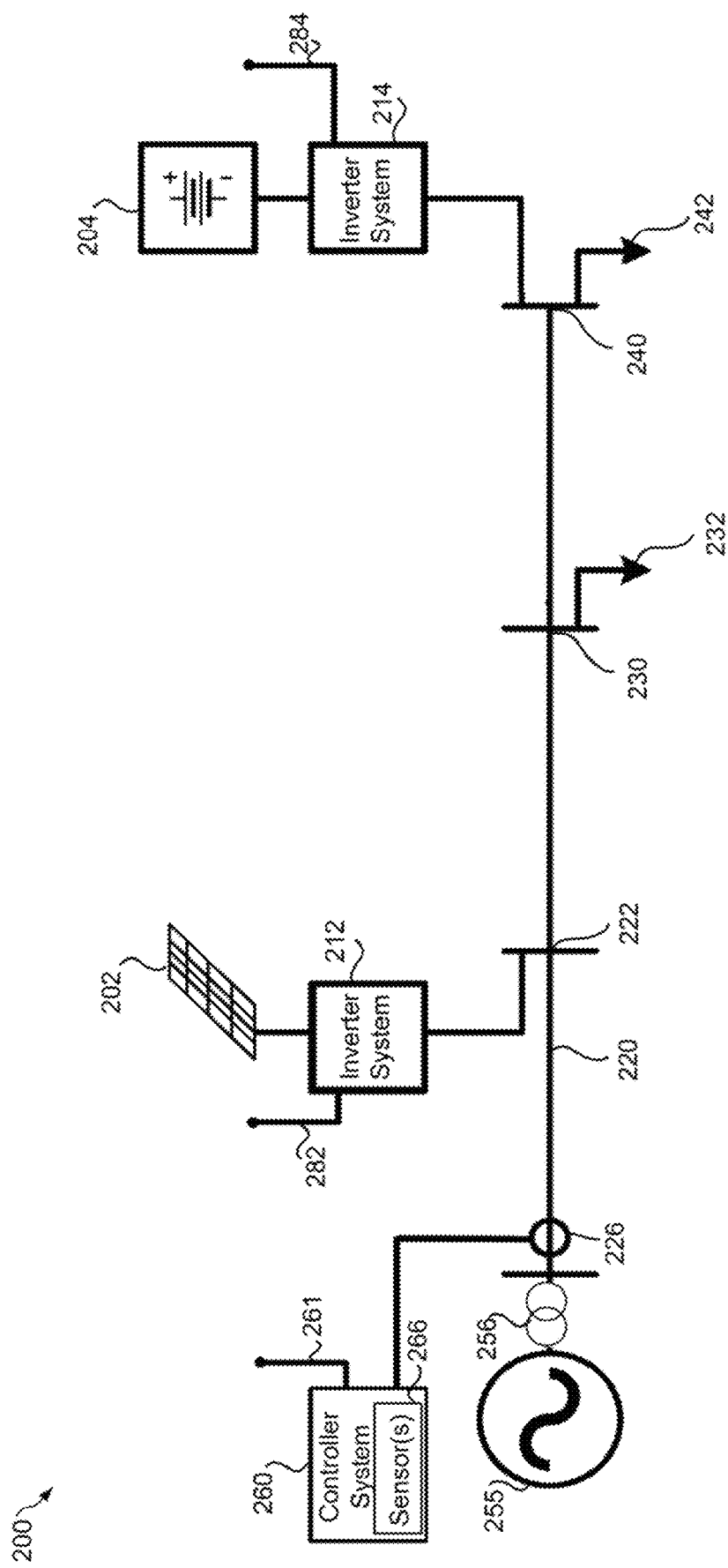
FIG. 2 is a diagram of a power network system with distributed energy resources and distributed inverter systems configured to inject constructive harmonic content to adaptively reduce destructive harmonic content caused by nonlinear loads, according to some embodiments of the present invention, which may be implemented in conjunction with any of the other FIGS. (e.g., FIGS. 1, 3A, 3B, 4-8).

FIG. 2 depicts a diagram of a power network system 200, in accordance with some embodiments of the present invention. The power network system 200 comprises a controller system 260 coupled to a PCC 220, a first inverter system 212 coupled to a first distributed energy resource 202, and a second inverter system 214 coupled to a second distributed energy resource 204. The power network system 200 includes the electric grid 255 (which includes an AC energy supply) and one or more transformers 256 coupled directly and/or indirectly to the PCC 220. The power network 200 further includes nonlinear loads 232 and 242 coupled directly and/or indirectly to the PCC 220. As shown, the first inverter system 212 is located at point 222 on the PCC 220, the first nonlinear load 232 is located at a point 230 on the PCC 220, and both the second inverter system 214 and the second nonlinear load 242 are located at a point 240 on the PCC 220.

Notably, because of the locations of the first inverter system 212, the second inverter system 214, the first nonlinear load 232 and the second nonlinear load 242, the first inverter system 212 may be positioned to more efficiently reduce destructive harmonic content caused by the first nonlinear load 232 and the second inverter system 214 may be positioned to more efficiently reduce destructive harmonic content from the second nonlinear load 242, e.g., because the constructive harmonic content may be less likely to attenuate or be drawn down alternative paths. For example, a portion of constructive harmonic content generated by the first inverter system 212 to reduce destructive harmonic content generated by the second nonlinear load 242 may be attenuated and drawn down the path to the first nonlinear load 232. Similarly, a portion of constructive harmonic content generated by the second inverter system 214 to reduce destructive harmonic content generated by the first nonlinear load 232 may be attenuated and drawn down the path to the second nonlinear load 242.

Although two energy resources, two inverter systems, and two loads are shown in FIG. 2, the power network system 200 may include any number of energy resources, inverter systems, and loads at any locations. Further, although the power network system 200 is shown having only one or more sensors 266 located at a point 226 in the controller system 260, the power network system 200 may include additional sensors that may be located anywhere in the power network system 200.

As indicated above, in some embodiments, the controller system 260 also tests a contributing distributed energy resource and inverter system to determine whether a decrease in constructive harmonic content results in the destructive harmonic content being reduced. The controller system 260 may perform the test by causing the contributing distributed energy resource and inverter system to reduce the constructive harmonic content it is contributing by the fixed amount. The test reduction efficiency will be compared to the efficiencies of added test constructive harmonic content efficiencies. Because reduction of the constructive harmonic content by the first distributed energy resource and the first distributed inverter system process would likely be found most efficient, the controller system 260 would select the contributing distributed energy resource and the distributed inverter system to decrease the first constructive harmonic content using an iterative reduction process similar to the iterative additive process. That way, some embodiments prevent a second inverter system from being selected to add second constructive harmonic content to offset first constructive harmonic content now being destructive. In some embodiments, if two inverter systems are found to have the same efficiency, but one is a reduction of constructive harmonic content, the inverter system reducing constructive harmonic content will be prioritized.

The controller system 260 may be configured to communicate via a wireless or wired connection. As shown, the controller system 260 includes a wireless antenna 261, the first inverter system 212 includes a wireless antenna 282, and the second inverter system 214 includes a wireless antenna 284. The controller system 260, the first inverter system 212, the second inverter system 214, and/or other components such as the distributed energy resources 202 and 204 and any additional sensors may be capable of communicating, e.g., via a suitable handshaking protocol such as Message Queue Telemetry Transport (MQTT). The network over which the controller system 260 communicates with the inverter systems may include any secured communication network such as an encrypted network. Alternatively, the network may be a wide area network (WAN) or local area network (LAN), public network, private network, IP or non-IP based network or other transmission medium.

Figure 3A:
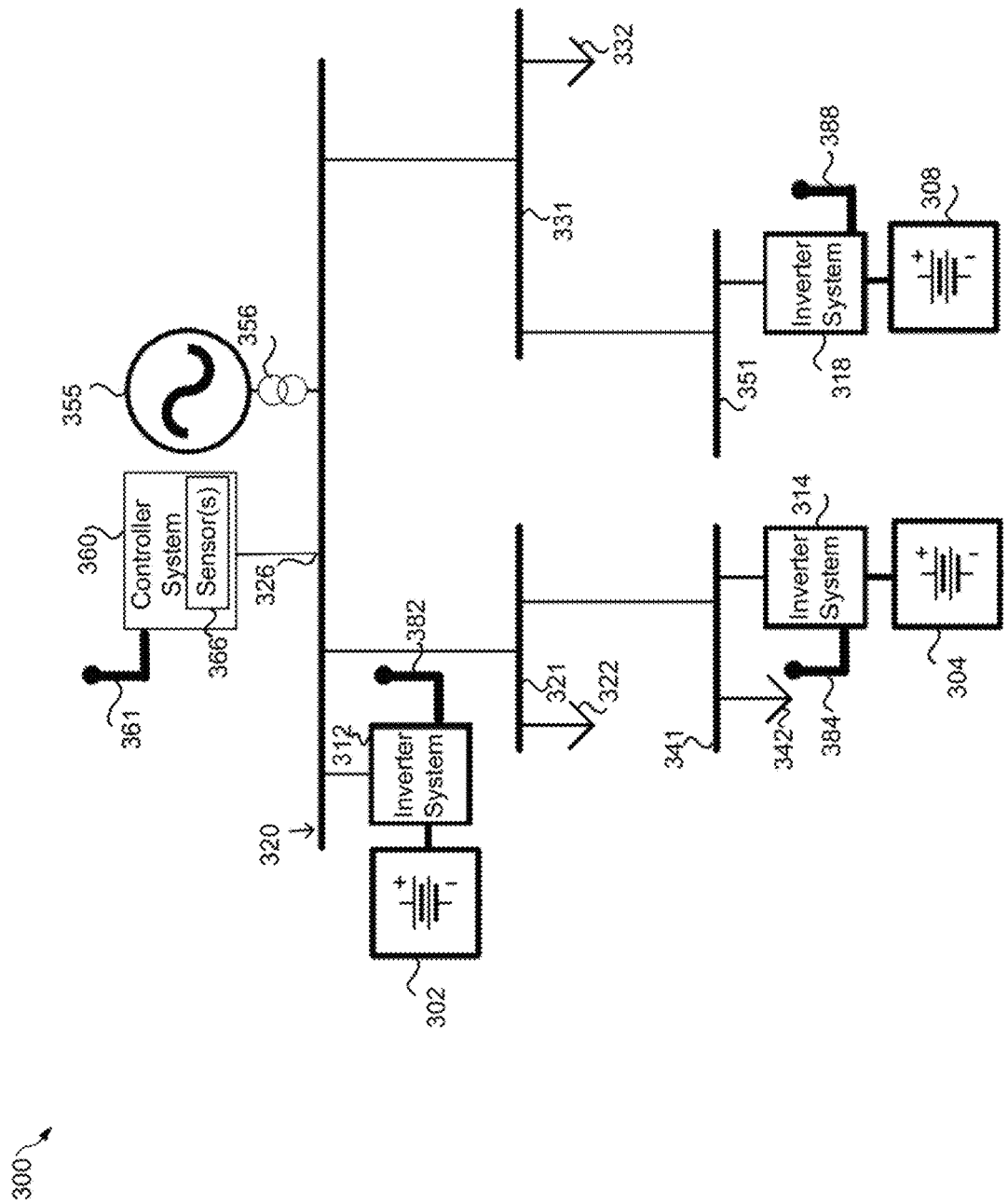
FIG. 3A is a diagram of a power network system with distributed energy resources and distributed inverter systems configured to inject constructive harmonic content to adaptively reduce destructive harmonic content caused by nonlinear loads, according to some embodiments of the present invention, which may be implemented in conjunction with any of the other FIGS. (e.g., FIGS. 1, 2, 3B, 4-8).

FIG. 3A depicts a diagram of a power network system 300, in accordance with some embodiments of the present invention. The power network system 300 comprises a controller system 360 coupled to a PCC 320, a first inverter system 312 coupled to a first distributed energy resource 302, a second inverter system 314 coupled to a second distributed energy resource 304, and a third inverter system 318 coupled to a third distributed energy resource 308. As shown, the first inverter system 312 is directly connected to the PCC 320. The second inverter system 314 is indirectly coupled to the PCC 320 via transmission lines 341 and 321. The third inverter system 318 is indirectly coupled to the PCC 320 via transmission lines 351 and 331. The power network system 200 further includes the electric grid 355 (which includes an AC energy supply) and one or more transformers 356 coupled directly and/or indirectly to the PCC 220. The power network 200 further includes nonlinear loads 322 coupled to transmission line 321, nonlinear load 342 coupled to transmission line 341 and nonlinear load 332 coupled to transmission line 331. As shown, the nonlinear loads 322, 332 and 342 and the inverter systems 312, 314 and 318 may be located anywhere within the power network system 300 and connected directly or indirectly to the PCC 320.

The controller system 360 may be configured to operate the same process as described above with regard to FIGS. 1 and 2. That is, the controller system 360 may include or more sensors 366 configured to detect destructive harmonic content of a particular order (e.g., third harmonic, fifth harmonic, seventh harmonic, etc.) on the PCC 320. Upon detecting destructive harmonic content of a particular order (or possibly destructive harmonic content of a particular order that exceeds a threshold) on the PCC 320, the controller system 360 may initiate a testing process to identify the distributed energy resource 302 and an inverter system 312, the distributed energy resource 304 and distributed inverter system 314 or the distributed energy resource 308 and the inverter system 318 to inject constructive harmonic content to reduce the destructive harmonic content detected on the PCC 320. The controller system 360 may first determine whether each of the distributed energy resources 302, 304 and/or 308 have sufficient energy capacity to provide constructive harmonic content. If so, the controller system 360 may cycle through them to inject test constructive harmonic content to determine the efficiency of the destructive harmonic content reduction each provides. The controller system 360 may select the inverter system 312, 314 or 318 that is most efficient or that exceeds a threshold efficiency. In some embodiments, when only attempting to locate an inverter system 312, 314 or 318 that meets a certain threshold efficiency, the controller system 360 may not cycle through all of the inverter systems 312, 314 and 318.

As noted above, because the locations are unknown, the controller system 360 may instruct each distributed inverter system 312, 314 and/or 318 to cycle through different phases (0, 10, 20 . . . 350) of the test constructive harmonic content to locate the phase with the most constructive effect. The controller system 360 may instruct each distributed inverter system 312, 314 and 318 to cycle through phases between 0 and 360 degrees at any discrete fixed or variable intervals. The intervals may be any value, such as 0.1 degrees, 1 degree, 5 degrees, 10 degrees, or any other value.

Upon selecting one of the inverter systems 312, 314 or 318 to generate constructive harmonic content, the controller system 360 may cause the selected inverter system 312, 314 or 318 to increase its constructive harmonic content at the selected phase until the detected destructive harmonic content is eliminated, drops below a certain threshold or the available power of the distributed energy resource 302, 304 or 308 is exhausted. If the available power is exhausted before the destructive harmonic content drops below guidelines, the controller system 360 may then repeat the process to identify a second distributed energy resource and an inverter system to inject additional constructive harmonic content to reduce the detected destructive harmonic content of the particular order. The controller system 360 may then repeat the process for other detected destructive harmonic content of other orders.

As indicated above, in some embodiments, the controller system 360 also tests a contributing distributed energy resource and inverter system to determine whether a decrease in constructive harmonic content results in the destructive harmonic content being reduced. The controller system 360 may perform the test by causing the contributing distributed energy resource and inverter system to reduce the constructive harmonic content it is contributing by the fixed amount. The test reduction efficiency will be compared to the efficiencies of added test constructive harmonic content efficiencies. Because reduction of the constructive harmonic content by the first distributed energy resource and the first distributed inverter system process would likely be found most efficient, the controller system 360 would select the contributing distributed energy resource and the distributed inverter system to decrease the first constructive harmonic content using an iterative reduction process similar to the iterative additive process. That way, some embodiments prevent a second inverter system from being selected to add second constructive harmonic content to offset first constructive harmonic content now being destructive. In some embodiments, if two inverter systems are found to have the same efficiency, but one is a reduction of constructive harmonic content, the inverter system reducing constructive harmonic content will be prioritized.

The controller system 360 may be configured to communicate via a wireless or wired network. As shown, the controller system 360 includes a wireless antenna 361, the first inverter system 312 includes a wireless antenna 382, the second inverter system 314 includes a wireless antenna 384, and the third inverter system 318 includes a wireless antenna 388. The controller system 360, the first inverter system 312, the second inverter system 314, the third inverter system 318 and/or other components such as the distributed energy resources 302, 304 and 308 and any additional sensors may be capable of communicating, e.g., via a suitable handshaking protocol such as Message Queue Telemetry Transport (MQTT). The network over which the controller system 360 communicates with the inverter systems may include any secured communication network such as an encrypted network. Alternatively, the network may be a wide area network (WAN) or local area network (LAN), public network, private network, IP or non-IP based network or other transmission medium.

Figure 3B:
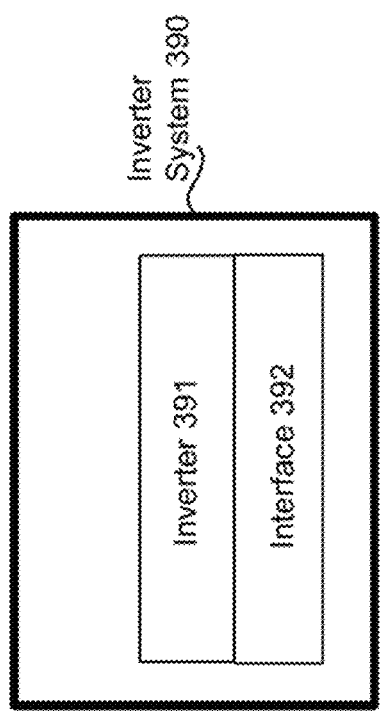
FIG. 3B is a block diagram illustrating details of an inverter system, according to some embodiments of the present invention, which may be implemented in conjunction with any of the other FIGS. (e.g., FIGS. 1, 2, 3A, 4-8).

FIG. 3B is a diagram of an inverter system 390, which may be an example of any of the inverter systems (e.g., the first inverter system 112, the second inverter system 114, the first inverter system 212, the second inverter system 214, the first inverter system 312, the second inverter system 314, and/or the third inverter system 318). The inverter system 390 may include an inverter 391 and an interface 392.

In some embodiments, the interface 392 includes one or more circuit interfaces, client interfaces, and/or application programming interfaces (APIs) configured to communicate with the respective controller system (e.g., the controller system 160, 260 or 360) and to control operations with the distributed energy resource or resources to which it is coupled and for which it services. In some embodiments, the interface 390 includes software, hardware, and/or firmware to connect to and control operations of the inverter system 390. For example, the interface 392 may convert a command from the controller system to inject constructive harmonic content (e.g., test constructive harmonic content or compensational constructive harmonic content) of different orders, at different phases and/or at different amplitudes. Similarly, the interface 392 may convert a command from the controller system to decrease constructive harmonic content (e.g., to perform a test reduction of constructive harmonic content or to iteratively reduce constructive harmonic content being contributed). The interface 392 may communicate, to the controller system, one or more operating conditions and/or attributes of the inverter system 390 and/or the distributed energy resources attached to it, such as a power capacity.

Figure 4:
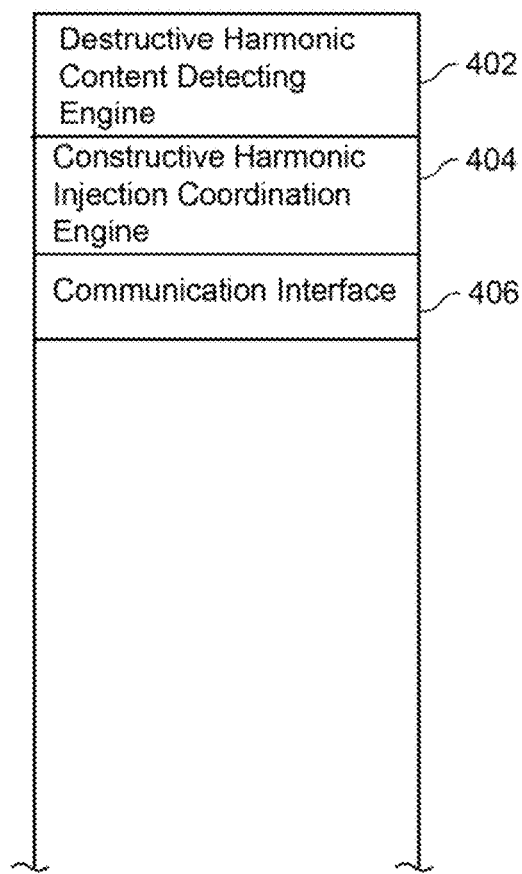
FIG. 4 is a block diagram illustrating details of a controller system, according to some embodiments of the present invention, which may be implemented in conjunction with any of the other FIGS. (e.g., FIGS. 1, 2, 3A-3B, 5-8).

FIG. 4 is a block diagram illustrating details of a controller system 400 (e.g., the controller system 160, 260, and/or 360), in accordance with some embodiments of the present invention.

The controller system 400 includes a destructive harmonic content detecting engine 402. The destructive harmonic content detecting engine 402 includes software, hardware (e.g., processors and/or circuitry) and/or firmware to detect one or more different orders of harmonics using one or more sensors, e.g., one or more sensors 166, 266 or 366.

The controller system 400 further includes a constructive harmonic injection coordination engine 404. The constructive harmonic injection coordination engine 404 includes software, hardware (e.g., processors and/or circuitry) and/or firmware to identify a distributed energy resource and a distributed inverter system to inject constructive harmonic content (or to reduce constructive harmonic content being contributed) to reduce the destructive harmonic content detected by the destructive harmonic content detecting engine 402. In some embodiments, the constructive harmonic injection coordination engine 404 may initiate a testing process to identify the distributed energy resource and inverter system to inject constructive harmonic content and to test reduction of constructive harmonic content to reduce the destructive harmonic content detected on the PCC. The constructive harmonic injection coordination engine 404 may first determine whether each of the distributed energy resources have sufficient energy capacity to provide constructive harmonic content. If so, the constructive harmonic injection coordination engine 404 may cycle through the inverters to inject test constructive harmonic content to determine the efficiency of the destructive harmonic content reduction each provides. The constructive harmonic injection coordination engine 404 may select the inverter system that is most efficient or that exceeds a threshold efficiency. In some embodiments, when only attempting to locate an inverter system that meets a certain threshold efficiency, the constructive harmonic injection coordination engine 404 may not cycle through all of the inverter systems. The constructive harmonic injection coordination engine 404 may prioritize reduction of constructive harmonic content over injection of new constructive harmonic content.

As noted above, because the locations are unknown, the constructive harmonic injection coordination engine 404 may instruct each distributed inverter system to cycle through different phases (0, 10, 20 . . . 350) of the test constructive harmonic content to locate the phase with the most constructive effect. The constructive harmonic injection coordination engine 404 may instruct each distributed inverter system to cycle through phases between 0 and 360 degrees at any discrete fixed or variable intervals. The intervals may be any value, such as 0.1 degrees, 1 degree, 5 degrees, 10 degrees, or any other value.

Upon selecting one of the inverter systems to generate constructive harmonic content, the constructive harmonic injection coordination engine 404 may cause the selected inverter system to iteratively increase its constructive harmonic content at the selected phase until the detected destructive harmonic content is eliminated, drops below a certain threshold or the available power of the distributed energy resource is exhausted. If the available power is exhausted before the destructive harmonic content drops below guidelines, the constructive harmonic injection coordination engine 404 may then repeat the process to identify a second distributed energy resource and an inverter system to inject additional constructive harmonic content to reduce the detected destructive harmonic content of the particular order.

The destructive harmonic content detecting engine 402 and the constructive harmonic injection coordination engine 404 may then repeat the process for other detected destructive harmonic content of other orders.

The controller system 400 may further include a communication interface 406.

Although engines are described separately, the engines may be integrated or combined into a single processor, circuit or unit.

Figure 5:
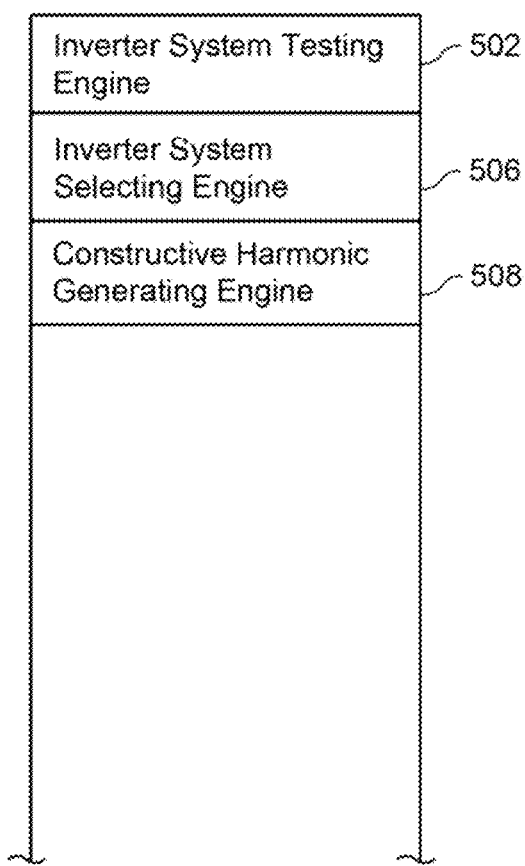
FIG. 5 is a block diagram illustrating details of a constructive harmonic content injection engine, according to some embodiments of the present invention, which may be implemented in conjunction with any of the other FIGS. (e.g., FIGS. 1, 2, 3A-3B, 4, 6-8).

FIG. 5 is a block diagram illustrating details of the constructive harmonic injection coordination engine 404, in accordance with some embodiments of the present invention. The constructive harmonic injection coordination engine 404 may include an inverter system testing engine 502, an inverter system selecting engine 506, and a constructive harmonic generating engine 508.

The inverter system testing engine 502 includes software, hardware (e.g., processors and/or circuitry) and/or firmware configured to initiate a testing process to identify the distributed energy resource and inverter system suitable to inject constructive harmonic content (or to reduce constructive harmonic content being contributed) to reduce the destructive harmonic content detected on the PCC. For those inverter systems being considered to add constructive harmonic content, the inverter system testing engine 502 may first determine whether each of the distributed energy resources has sufficient energy capacity to provide constructive harmonic content. If so, the inverter system testing engine 502 may cycle through the inverters to inject test constructive harmonic content at various phases to determine the efficiency of the destructive harmonic content reduction each provides. All inverter systems contributing constructive harmonic content being tested for reduction will be tested regardless of whether they have sufficient capacity, since they are only being tested for reduction of constructive harmonic content being rejected.

As noted above, because the locations are unknown, the inverter system testing engine 502 may instruct each distributed inverter system to cycle through different phases (0, 10, 20 . . . 350) of the test constructive harmonic content to locate the phase with the most constructive effect. The inverter system testing engine 502 may instruct each distributed inverter system to cycle through phases between 0 and 360 degrees at any discrete fixed or variable intervals. The intervals may be any value, such as 0.1 degrees, 1 degree, 5 degrees, 10 degrees, or any other value.

The inverter system selecting engine 506 includes software, hardware (e.g., processors and/or circuitry) and/or firmware configured to select the inverter system that is most efficient or that exceeds a threshold efficiency.

The constructive harmonic generating engine 508 includes software, hardware (e.g., processors and/or circuitry) and/or firmware configured to inject constructive harmonic content at the various phases and at various amplitudes (or reduce constructive harmonic content being injected). The constructive harmonic generating engine 508 may inject or reduce the test constructive harmonic content and inject or reduce constructive harmonic content to reduce the destructive harmonic content.

Figure 6:
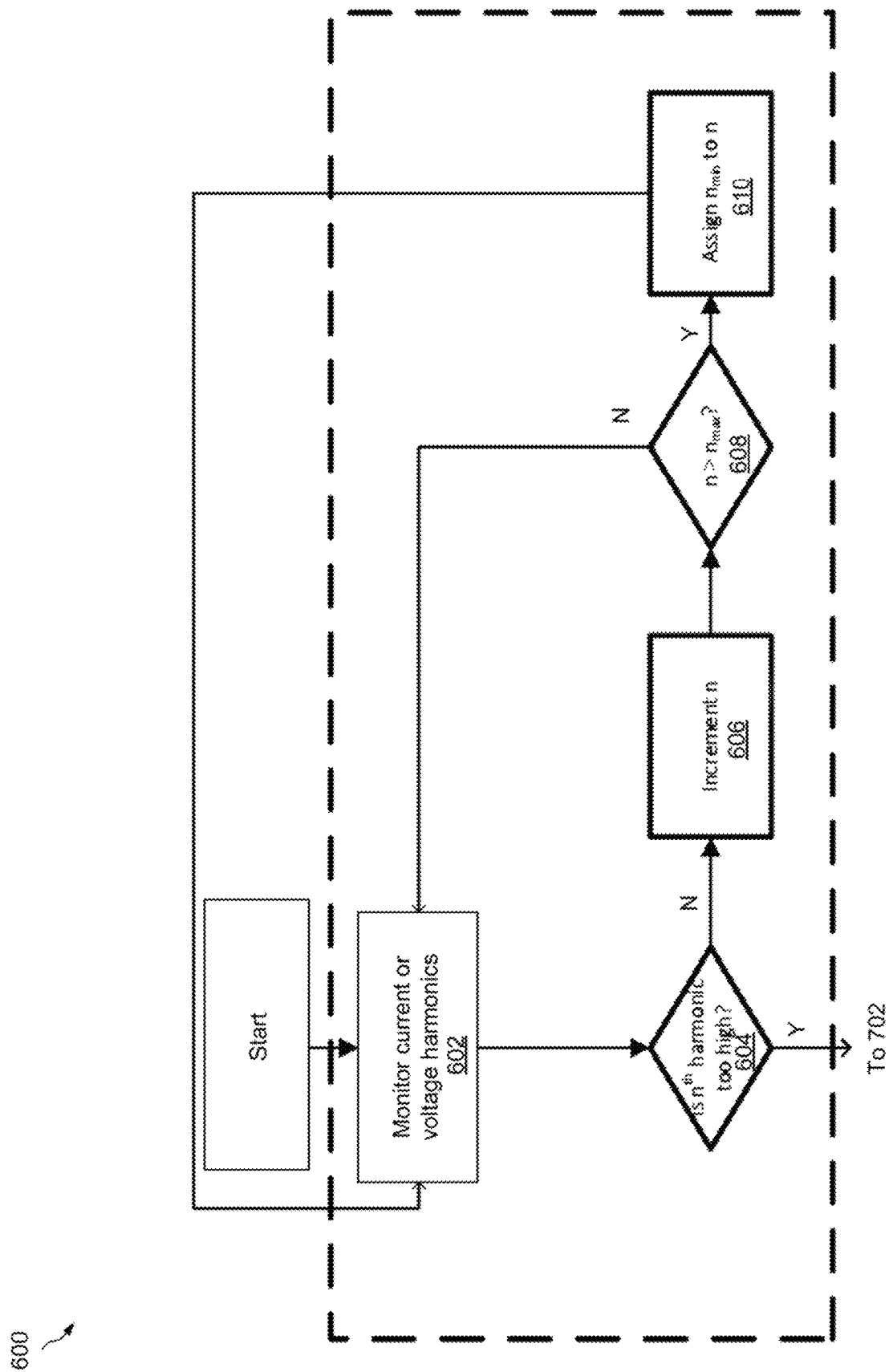
FIG. 6 is a flowchart illustrating a method of detecting destructive harmonic content, according to some embodiments of the present invention, which may be implemented in conjunction with any of the other FIGS. (e.g., FIGS. 1, 2, 3A-3B, 4-5, 7-8).

FIG. 6 is a flowchart of a method 600 of detecting destructive harmonic content, in accordance with some embodiments of the present invention. The method 600 begins in step 602 with the monitoring for destructive harmonic content at a particular order (e.g., third, fifth, seventh, ninth, etc.). In step 604, a determination is made whether an amount of nth-order harmonic (e.g., third order) is too high (e.g., exceeding a particular threshold for that harmonic). In response to a positive determination that the nth-order harmonic is too high, the method proceeds to step 702 as illustrated in FIG. 7. In response to a negative determination that the level of the nth-order harmonic is not too high, the method 600 proceeds to step 606 to increment the order of the harmonic (to the next odd order, e.g., fifth order). In step 608, a determination is made as to whether the newly incremented harmonic order exceeds a threshold harmonic order to be monitored. In response to a negative determination, the method 600 returns to step 602 to monitor the amount of destructive harmonic content at the newly incremented harmonic (e.g., fifth order). In response to a positive determination (e.g., the newly incremented harmonic exceeds the threshold harmonic order), the method 600 proceeds to step 610 to reset the harmonic order back to a minimum order to be monitored (e.g., third) and then returns to the step 602 to monitor the lowest order harmonic. Accordingly, the method 600 iteratively monitors harmonics of different orders.

Figure 7A:
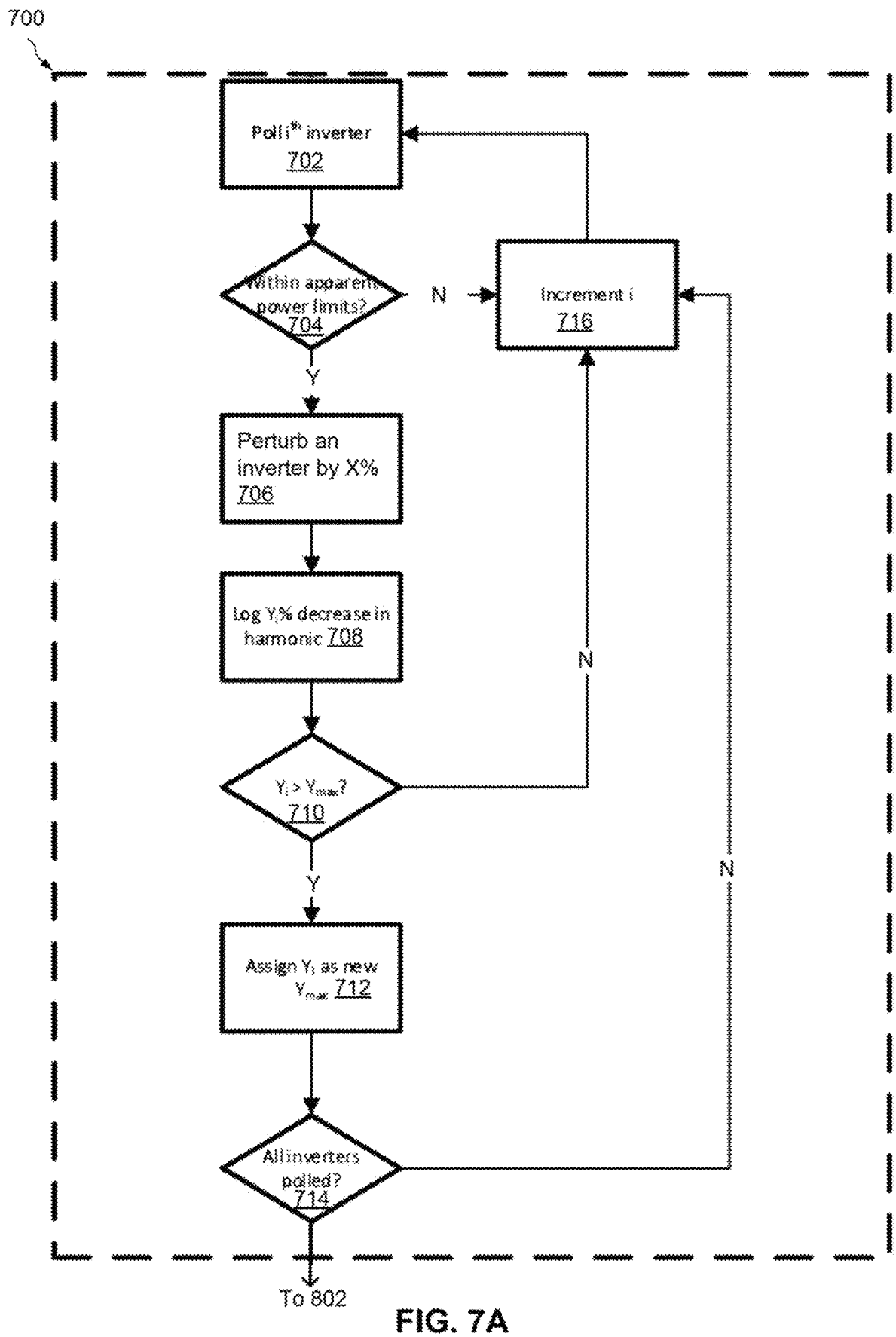
FIGS. 7A and 7B are flowchart illustrating a method of selecting a distributed energy resource and an inverter system to supply constructive harmonic content, according to some embodiments of the present invention, which may be implemented in conjunction with any of the other FIGS. (e.g., FIGS. 1, 2, 3A-3B, 4-6, 8).

FIG. 7A is a flowchart of a method 700 of testing the system to identify a particular inverter system which is most efficient in reducing destructive harmonic content of a given order determined according to the method 600. The method begins in step 702 with identifying the $i^{th}$ inverter system (e.g., initially the first inverter system). In step 704, a determination is made whether the $i^{th}$ inverter system has sufficient apparent power to generate constructive harmonic content. Upon a negative determination, the method 700 proceeds to step 716 to increase i and then returns to step 702 so that the next inverter may be polled. Upon a positive determination in step 704, in step 706, the $i^{th}$ inverter system is instructed to be perturbed (e.g., a positive or negative perturbation) by a fixed amount. Here, perturb may refer to causing the $i^{th}$ inverter system to generate test constructive harmonic content at a variety of different phases by a fixed amount. Alternatively, perturb may also refer to decreasing by a fixed amount constructive harmonic content being contributed. In step 708, a resulting amount of decrease in the destructive harmonic content of the given harmonic order is logged. In step 710, a determination is made whether the resulting amount of decrease is greater than the amounts of decrease of the prior inverter systems tested. Upon a negative determination, the method 700 proceeds to step 716 to increase i and returns to step 702 so that the next inverter may be polled. Upon a positive determination in step 710, in step 712, the controller system identifies the inverter system as thus far providing the greatest recorded level of decrease and proceeds to step 714. In step 714, a determination is made whether all inverter systems have been tested. Upon a negative determination, the method 700 proceeds to step 716 to increment i and returns to step 702 so that the next inverter may be polled. Upon positive determination in step 716, the method 700 transitions to step 802 as described in FIG. 8. In this manner, the method 700 iterates through the inverter systems to determine the inverter system that most efficiently reduces destructive harmonic content of the given order.

Figure 7B:
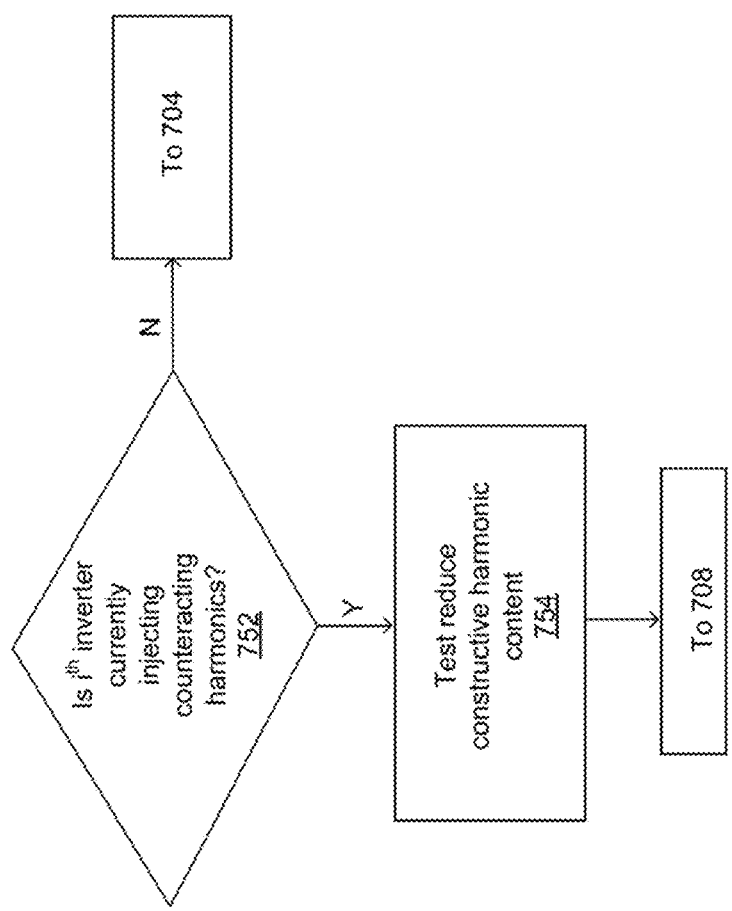

FIG. 7B is a flowchart of a method 750 of testing the system to identify a particular inverter system which is contributing constructive harmonic content of a given order that may or may not be destructive harmonic. The method begins in step 752 with identifying an $i^{th}$ inverter system that is currently injecting constructive harmonic content. In response to a positive determination in step 752, in step 754, the inverter system is tested with a test reduction of a fixed amount in the constructive harmonic content being contributed. The method then proceeds to step 708. In response to a negative determination in step 752, the method proceeds to the step 704.

Figure 8:
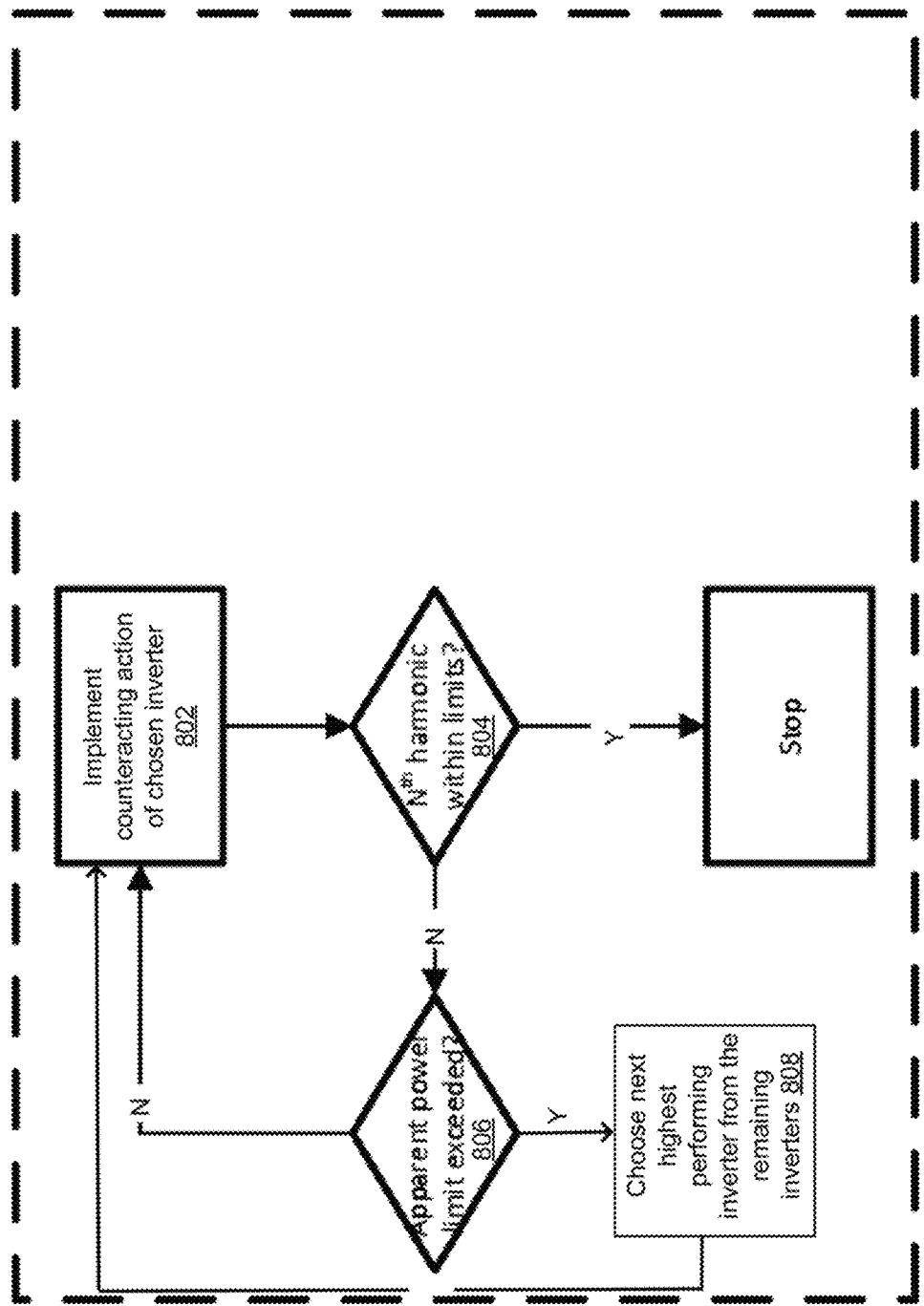
FIG. 8 is a flowchart illustrating a method of injecting constructive harmonic content, according to some embodiments of the present invention, which may be implemented in conjunction with any of the other FIGS. (e.g., FIGS. 1, 2, 3A-3B, 4-6, 7A, 7B).

FIG. 8 is a flowchart of a method 800 of generating constructive harmonic content (or reducing constructive harmonic content being injected) to reduce destructive harmonic content of a given order, in accordance with some embodiments of the present invention. The method 800 begins in step 802 with the most efficient inverter system selected in the method 700 iteratively increasing (or reducing) constructive harmonic content to reduce the destructive harmonic content detected according to the method 600. In step 804, a determination is made whether the iterative increase or decrease of constructive harmonic content by the selected inverter system, sufficiently reduces the destructive harmonic content of the given order to an amount below a threshold limit. Upon a positive determination, the method 800 concludes. Upon a negative determination in step 804, in step 806 a determination is made whether the apparent power capacity of the selected inverter system has been exceeded. Upon a negative determination in step 806 indicating that the selected inverter system still has additional apparent power capacity, then the method returns to step 802 to continue to iteratively increase or decrease the amount of constructive harmonic content. Upon a positive determination in step 806 that apparent power capacity of the selected inverter system has been exceeded (in the case of increases) or that the constructive harmonic content being injected has exhausted (in the case of decreases), then the method 800 goes to step 808 to select the next best inverter system and return to step 802 to begin iteratively increasing or decreasing constructive harmonic content to further reduce the destructive harmonic content. In other embodiments, upon a positive determination in step 806, the method may transition back to the step 702 to repoll inverter systems. This may be applicable, for example, when the controller system is not maintaining efficiency ratings of the previously polled inverter systems.

Figure 9:
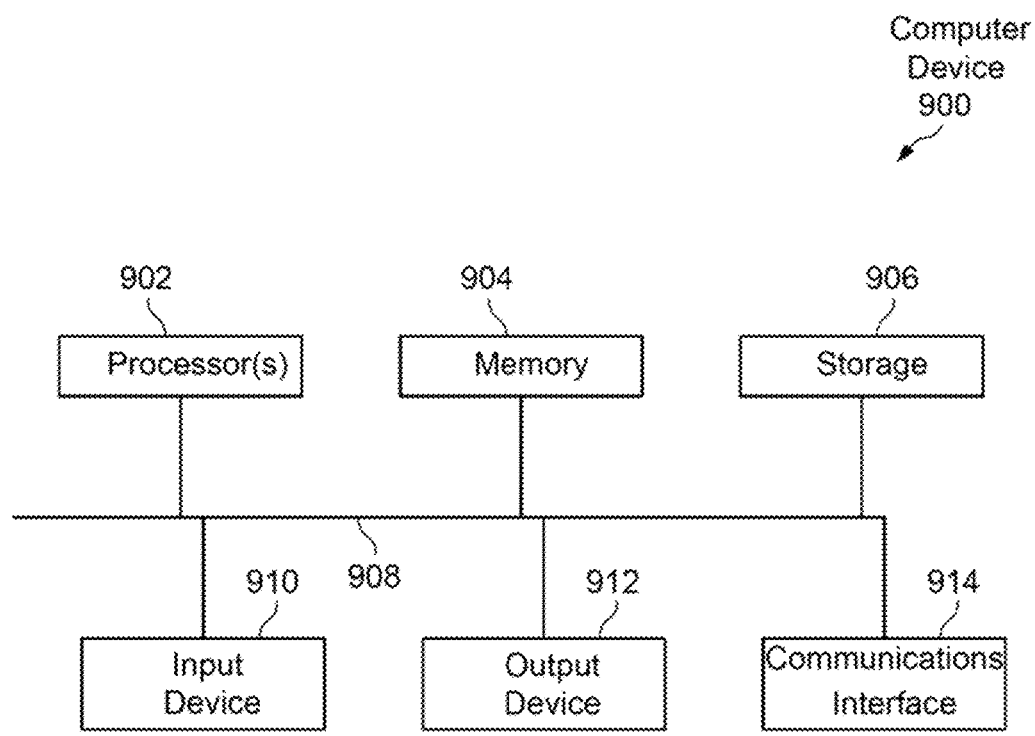
FIG. 9 is a block diagram illustrating details of a computing system, according to some embodiments of the present invention.

FIG. 9 is a block diagram of a computing device 900. Any of the controller system 160, the controller system 260, the controller system 360, and/or engines described herein may comprise an instance of the computing device 900. In some embodiments, functionality of the computing device 900 performs some or all of the functionality described herein. The computing device 900 comprises a processor 902, memory 904, storage 906, an input device 910, a communication network interface 914, and an output device 912 communicatively coupled to a communication channel 908. The processor 902 is configured to execute executable instructions (e.g., programs), and may be implemented as or part of the controller system 160, 260, and/or 460. In some embodiments, the processor 902 comprises circuitry or any processor capable of processing the executable instructions.

The memory 904 stores data. Some examples of memory 904 include storage devices, such as RAM, ROM, RAM cache, virtual memory, etc. In various embodiments, working data is stored within the memory 904. The data within the memory 904 may be cleared or ultimately transferred to the storage 906.

The storage 906 includes any storage configured to retrieve and store data. Some examples of the storage 906 include flash drives, hard drives, optical drives, cloud storage, and/or magnetic tape. In some embodiments, storage 906 may include RAM. Each of the memory 904 and the storage 906 comprises a computer-readable medium, which stores instructions or programs executable by processor 902.

The input device 910 may be any device that inputs data (e.g., mouse and keyboard). The output device 912 may be any device that outputs data and/or processed data (e.g., a speaker or display). It will be appreciated that the storage 906, input device 910, and output device 912 may be optional. For example, the routers/switchers may comprise the processor 902 and memory 904 as well as a device to receive and output data (e.g., the communication network interface 914 and/or the output device 912).

The communication network interface 914 may be coupled to a network (e.g., the network 162) via the link 908. The communication network interface 914 may support communication over an Ethernet connection, a serial connection, a parallel connection, and/or an ATA connection. The communication network interface 914 may also support wireless communication (e.g., 802.11 a/b/g/n, WiMax, LTE, WiFi). It will be apparent that the communication network interface 914 may support many wired and wireless standards.

It will be appreciated that the hardware elements of the computing device 900 are not limited to those depicted. A computing device 900 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 902 and/or a co-processor located on a GPU (i.e., NVidia).

It will be appreciated that an "engine," "system," "datastore," "controller system," and/or "controller" may comprise software, hardware, firmware, and/or circuitry. In one example, one or more software programs comprising instructions capable of being executable by a processor may perform one or more of the functions of the engines, systems, datastores, and/or controller or controller system described herein. In another example, circuitry may perform the same or similar functions. Alternative embodiments may comprise more, less, or functionally equivalent engines, systems, datastores, or databases, and still be within the scope of present embodiments. For example, the functionality of the various engines, systems, datastores, and/or controller may be combined or divided differently. The datastores may include cloud storage.

The term "or," as used herein, may be construed in either an inclusive or exclusive sense. Moreover, plural instances may be provided for resources, operations, or structures described herein as a single instance. The term "request" or "command" shall include any computer instruction, whether permissive or mandatory.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or controller described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines.

In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Recitation of numeric ranges of values throughout the specification is intended to serve as a shorthand notation of referring individually to each separate value falling within the range inclusive of the values defining the range, and each separate value is incorporated in the specification as it were individually recited herein. References to "approximately" may be construed to encompass values within a certain range of the specified value, such as within 25 percent, 10 percent, 5 percent, 1 percent, 0.5 percent, 0.25 percent, 0.1 percent, or any other applicable value. For example, 180 degrees out of phase may refer to any value that is approximately 180 degrees out of phase. In other embodiments, "approximately" may refer to a value or load being within a design tolerance to achieve an objective or result. For example, constructive harmonic content being approximately 180 degrees out of phase may refer to a design level or tolerance to sufficiently counteract destructive harmonic content to within a threshold level of destructive harmonic content. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

In methods herein are provided by way of example. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A controller system for reducing destructive harmonic content within a power network system, the power network system comprising one or more distributed energy resources, one or more distributed inverter systems, one or more nonlinear loads, and a bus coupling the one or more distributed energy resources to the one or more nonlinear loads, the controller system comprising:
  one or more sensors;
  one or more hardware processors; and
  memory storing computer instructions, the computer instructions when executed by the one or more hardware processors configured to perform:
    receiving, by the one or more sensors, sensor data indicative of destructive harmonic content of a particular order on the bus;
    selecting a particular distributed inverter system of the one or more distributed inverter systems to inject constructive harmonic content to reduce the destructive harmonic content, the selecting including
      causing one of the one or more distributed inverter systems to generate first test constructive harmonic content of the particular order at different phases;
      monitoring an amount of reduction in the destructive harmonic content to identify its efficiency;
      determining that the one of the one or more distributed inverter systems has an efficiency greater than a threshold; and
      selecting the one of the one or more distributed inverter systems as the particular distributed inverter system; and
    using a particular distributed energy resource and the particular distributed inverter system to inject the constructive harmonic content to reduce the destructive harmonic content.

2. The system of claim 1, wherein the destructive harmonic content comprises harmonic current.

3. The controller system of claim 1, wherein the computer instructions when executed further cause the step of confirming that the particular distributed energy resource has sufficient available output power to inject at least a portion of the constructive harmonic content.

4. The controller system of claim 1, wherein the computer instructions when executed further cause the step of
  iteratively increasing an amount of constructive harmonic content until either the destructive harmonic content has gone below a threshold harmonic content limit or output power of the particular distributed energy resource has gone below a threshold power limit.

5. The controller system of claim 1, wherein the particular distributed energy resource is coupled indirectly to the bus.

6. The controller system of claim 1, wherein at least one of the one or more nonlinear loads is coupled indirectly to the bus.

7. The controller system of claim 1, wherein the computer instructions when executed further cause the steps of
  receiving, by the one or more sensors, second sensor data indicative of second destructive harmonic content of a second particular order on the bus; and
  using a second particular distributed energy resource and a second particular distributed inverter system to inject second constructive harmonic content to reduce the second destructive harmonic content.

8. The controller system of claim 1, wherein the computer instructions when executed further cause the step of using a second particular distributed energy resource and a second particular distributed inverter system to inject additional constructive harmonic content to reduce the destructive harmonic content.

9. A method implemented by a controller system for reducing destructive harmonic content within a power network system, the power network system comprising one or more distributed energy resources, one or more distributed inverter systems, one or more nonlinear loads, and a bus coupling the one or more distributed energy resources to the one or more nonlinear loads, the method comprising:
  receiving, by one or more sensors, sensor data indicative of destructive harmonic content of a particular order on the bus;
  selecting a particular distributed inverter system of the one or more distributed inverter systems to inject constructive harmonic content to reduce the destructive harmonic content, the selecting including
    causing one of the one or more distributed inverter systems to generate first test constructive harmonic content of the particular order at different phases;
    monitoring an amount of reduction in the destructive harmonic content to identify its efficiency;
    determining that the one of the one or more distributed inverter systems has an efficiency greater than a threshold; and
    selecting the one of the one or more distributed inverter systems as the particular distributed inverter system; and
  using a particular distributed energy resource and the particular distributed inverter system to inject the constructive harmonic content to reduce the destructive harmonic content.

10. The method of claim 9, wherein the destructive harmonic content comprises harmonic current.

11. The method of claim 9, further comprising confirming that the particular distributed energy resource has sufficient available output power to inject at least a portion of the constructive harmonic content.

12. The method of claim 9, further comprising
  iteratively increasing an amount of constructive harmonic content until either the destructive harmonic content has gone below a threshold harmonic content limit or output power of the particular distributed energy resource has gone below a threshold power limit.

13. The method of claim 9, wherein the particular distributed energy resource is coupled indirectly to the bus.

14. The method of claim 9, wherein at least one of the one or more nonlinear loads is coupled indirectly to the bus.

15. The method of claim 9, further comprising
  receiving, by the one or more sensors, second sensor data indicative of second destructive harmonic content of a second particular order on the bus; and
  using a second particular distributed energy resource and a second particular distributed inverter system to inject second constructive harmonic content to reduce the second destructive harmonic content.

16. The method of claim 9, further comprising using a second particular distributed energy resource and a second particular distributed inverter system to inject additional constructive harmonic content to reduce the destructive harmonic content.

17. A controller system for reducing destructive harmonic content within a power network system, the power network system comprising one or more distributed energy resources, one or more distributed inverter systems, one or more nonlinear loads, and a bus coupling the one or more distributed energy resources to the one or more nonlinear loads, the controller system comprising:
  one or more sensors;
  one or more hardware processors; and
  memory storing computer instructions, the computer instructions when executed by the one or more hardware processors configured to perform:

receiving, by the one or more sensors, sensor data indicative of destructive harmonic content of a particular order on the bus;

selecting a particular distributed inverter system of the one or more distributed inverter systems to inject constructive harmonic content to reduce the destructive harmonic content, the selecting including causing each of the one or more distributed inverter systems to generate first test constructive harmonic content of the particular order at different phases; and monitoring an amount of reduction in the destructive harmonic content to identify one of the one or more distributed inverter systems with greatest efficiency as the particular distributed inverter system; and using a particular distributed energy resource and the particular distributed inverter system to inject the constructive harmonic content to reduce the destructive harmonic content.

18. The controller system of claim 17, wherein the computer instructions when executed further cause the step of confirming that the particular distributed energy resource has sufficient available output power to inject at least a portion of the constructive harmonic content.

19. The controller system of claim 17, wherein the computer instructions when executed further cause the step of iteratively increasing an amount of constructive harmonic content until either the destructive harmonic content has gone below a threshold harmonic content limit or output power of the particular distributed energy resource has gone below a threshold power limit.

20. The controller system of claim 17, wherein the computer instructions when executed further cause the steps of receiving, by the one or more sensors, second sensor data indicative of second destructive harmonic content of a second particular order on the bus; and using a second particular distributed energy resource and a second particular distributed inverter system to inject second constructive harmonic content to reduce the second destructive harmonic content.

21. The controller system of claim 17, wherein the computer instructions when executed further cause the step of using a second particular distributed energy resource and a second particular distributed inverter system to inject additional constructive harmonic content to reduce the destructive harmonic content.

22. A method implemented by a controller system for reducing destructive harmonic content within a power network system, the power network system comprising one or more distributed energy resources, one or more distributed inverter systems, one or more nonlinear loads, and a bus coupling the one or more distributed energy resources to the one or more nonlinear loads, the method comprising:

receiving, by one or more sensors, sensor data indicative of destructive harmonic content of a particular order on the bus;

selecting a particular distributed inverter system of the one or more distributed inverter systems to inject constructive harmonic content to reduce the destructive harmonic content, the selecting including causing each of the one or more distributed inverter systems to generate first test constructive harmonic content of the particular order at different phases; and monitoring an amount of reduction in the destructive harmonic content to identify one of the one or more distributed inverter systems with greatest efficiency as the particular distributed inverter system; and using a particular distributed energy resource and the particular distributed inverter system to inject the constructive harmonic content to reduce the destructive harmonic content.

23. The method of claim 22, further comprising confirming that the particular distributed energy resource has sufficient available output power to inject at least a portion of the constructive harmonic content.

24. The method of claim 22, further comprising iteratively increasing an amount of constructive harmonic content until either the destructive harmonic content has gone below a threshold harmonic content limit or output power of the particular distributed energy resource has gone below a threshold power limit.

25. The method of claim 22, further comprising receiving, by the one or more sensors, second sensor data indicative of second destructive harmonic content of a second particular order on the bus; and using a second particular distributed energy resource and a second particular distributed inverter system to inject second constructive harmonic content to reduce the second destructive harmonic content.

26. The method of claim 22, further comprising using a second particular distributed energy resource and a second particular distributed inverter system to inject additional constructive harmonic content to reduce the destructive harmonic content.

* * * * *